United States Patent [19]

Stein et al.

[11] Patent Number: 5,325,452
[45] Date of Patent: Jun. 28, 1994

[54] DEVICE FOR CLEANING AND POLISHING AN OPTICAL FIBER

[76] Inventors: Harold M. Stein, 144 Beekman Dr., Agawam, Mass. 01001; David J. Stein, 11 Ramah St., Springfield, Mass. 01104

[21] Appl. No.: 45,972

[22] Filed: Apr. 9, 1993

[51] Int. Cl.$^5$ .............................................. G02B 6/36
[52] U.S. Cl. ........................................ 385/67; 385/85
[58] Field of Search ..................................... 385/67, 85

[56] References Cited

U.S. PATENT DOCUMENTS

| | | | |
|---|---|---|---|
| 3,936,143 | 2/1976 | Sato | 385/67 |
| 4,146,300 | 3/1979 | Kaiser | 385/67 |
| 4,167,304 | 9/1979 | Gelbke | 385/85 |
| 4,239,333 | 12/1980 | Dakss et al. | 385/67 |
| 4,856,865 | 8/1989 | Lee | 385/67 |

OTHER PUBLICATIONS

Joseph E. Denny, "Connector Geometry Raises Fiberoptic-Link Performance", *Laser Focus World*, Aug. 1992, pp. 123–130.

Primary Examiner—Frank Gonzalez
Attorney, Agent, or Firm—Richard H. Kosakowski

[57] ABSTRACT

A mechanical connector that normally interfaces two fiber optic cables together has a fiber optic cable inserted in a receptacle on one side of the connector. A device for cleaning and/or polishing the end surface of an optical fiber strand within the cable is disposed in a second receptacle on the opposite side of the connector. The device includes an insert located within the receptacle in the connector, the insert having a hole drilled therethrough that is eccentric to the transmission axis of the optical fiber strand. A cleaning rod may be inserted in the eccentric hole in the insert such that an end surface of the cleaning rod contacts the end surface of the optical fiber strand therein. The cleaning rod is rotated to effectuate cleaning of the end surface of the fiber optic cable and corresponding optical fiber strand. In the alternative, the polishing rod may be inserted in the eccentric hole in the insert and rotated so as to effectuate polishing of the end surface of the optical fiber strand.

25 Claims, 2 Drawing Sheets

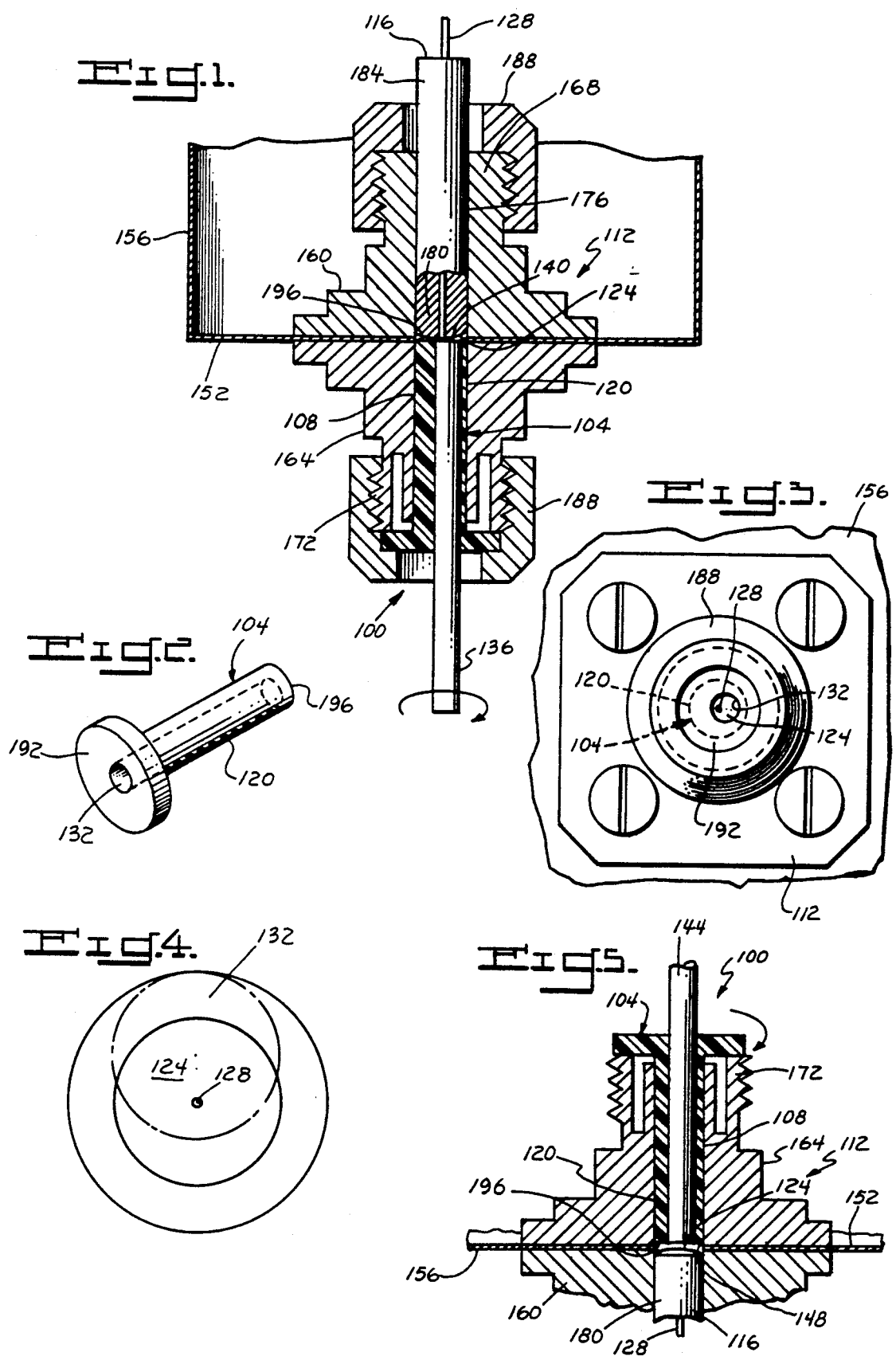

DEVICE FOR CLEANING AND POLISHING AN OPTICAL FIBER

BACKGROUND OF THE INVENTION

This invention relates to a device for cleaning and polishing an optical fiber, and more particularly to a device for cleaning and polishing the end of an optical fiber either after the fiber and its surrounding cable have been installed in a connector, or after resin treatment (i.e., encapsulation) of the fiber.

The use of fiber optic cable as the transmission medium for information has become increasingly prevalent. Fiber optic cable has a number of advantages over the well-known electrical wire transmission schemes, such as coaxial cable for video signals or twisted-pair wiring for data transmission. Included among the advantages are low-loss, low-cost, high-bandwidth, transmission security and a larger number of data paths per circular area of the transmission medium. The low-loss characteristic allows data to be transmitted over greater distances before the signal must be amplified by "booster" equipment. Perhaps the biggest advantage of fiber optic cables over electrical wire, though, is the higher integrity of the transmitted information due to the immunity of the fiber optic cable from electromagnetic interference.

Notwithstanding the foregoing, fiber optic cable is not without its disadvantages. For example, due to the relatively small diameter of the "core" portion of the optical fiber strand (e.g., on the order of eight microns for a single mode fiber) within the cable, it is critical that, at a junction or interface between the ends of two fiber optic cables, the transmission axis (i.e., the core) of each optical fiber strand be in precise alignment with one another. This is to ensure that all of the light energy propagating within the core of one strand is transferred to the core of the other strand.

Further, due to the small diameter size of the optical fiber strand (which is defined herein to mean the inner core portion together with its surrounding cladding portion), the fiber strand is normally encased in an outer protective cable of relatively much larger diameter. For example, a single mode fiber has an inner core portion of optically pure glass of a diameter of 8 microns, surrounded by a cladding portion of less pure glass of a diameter of 125 microns. Surrounding the cladding may be several outer concentric layers, including a silicone coating surrounding the cladding, followed by a buffer jacket. Next may be a concentric layer of strength members, followed by an outer polyurethane jacket. All of the outer concentric layers following the cladding are referred to hereinafter collectively as the "outer cable". The diameter of the outer cable may approach 4.5 mm. The outer cable aids in the handling of the fiber and also prevents the fiber from bending at too sharp of an angle, which could cause breakage of the fiber.

At the termination point of the cable (e.g., at a piece of "repeater" equipment that increases or "boosts" the amplitude of the optical signal), the cable is held in place in a receptacle on one side of a mechanical connector. The connector may be mounted to a panel of the housing of the booster equipment. A second fiber optic cable may be held in place in a receptacle located on the opposite side of the connector. The optical axis of each strand and corresponding outer fiber optic cable are in alignment with one another at an interface point. Alternatively, a light source or receiver may be located on the opposite side of the connector for interface with the fiber optic cable.

However, the interface between the ends of the two optical fiber strands is susceptible to fine dirt and dust particles and grease with the result that the exposed end of one or both optical fiber strands may become contaminated. This occurs when the interface is exposed to the atmosphere for any reason (e.g., when connecting or disconnecting the cables). This could lead to a possible severe degradation in the amount of light energy transferred between the fiber strands. In such case, it is known to disassemble the fiber optic cable from the corresponding coupling of the mechanical connector and clean the end of the fiber cable with an appropriate cleaning device and associated solution. However, such disassembly is impractical and oftentimes unfeasible, given the nature of the connector and its associated equipment.

In the prior art, it is known to insert a rod or a swab, saturated with a cleaning solution, into a receptacle in a connector in an attempt to clean the optical fiber strand. However, such attempts were not always successful because the rod or swab did not always wipe through the center of the optical fiber strand. However, such conventional method may suffice for cleaning other portions of the end surface of the cable.

Heretofore, no known method and means exist for effective cleaning and polishing the end of the optical fiber strand while the strand and corresponding fiber optic cable are held in the connector.

Accordingly, it is a principal object of the invention to provide a device for cleaning the end surface of an optical fiber strand surrounded by an outer fiber optic cable and mounted in the connector without first disassembling the cable from the connector.

It is a general object of the invention to provide a device for quickly and efficiently cleaning the end surface of an optical fiber strand mounted in a connector.

It is a further object of the invention to provide a device for polishing and/or cleaning the end of an optical fiber strand mounted in a connector.

It is a still further object of the invention to provide a device for polishing the end of an optical fiber strand prior to insertion of the fiber in a connector.

The above and other objects and advantages of this invention will become more readily apparent when the following description is read in conjunction with the accompanying drawings.

SUMMARY OF THE INVENTION

To overcome the deficiencies of the prior art and to achieve the objects listed above the, Applicants have invented a device for cleaning and polishing an end surface of an optical fiber strand. The device may also be used to clean and polish a portion of an end surface of the surrounding fiber optic cable.

In a preferred embodiment of the invention, a mechanical connector having a fiber optic cable inserted in a receptacle on one side of the connector also has a second receptacle located on an opposite side of the connector, the second receptacle normally has a second fiber optic cable inserted therein. The two fiber optic cables are held in the connector such that end surfaces of the two cables are disposed adjacent to each other and held in alignment for maximum transfer of light energy between the two corresponding optical fiber strands within the cables. In place of the second fiber optic cable, an insert (preferably made of nylon) is disposed in the corresponding receptacle of the connector. The insert has a throughbore or "hole" formed therein whose axis is eccentric to the axis of the optical fiber strand inserted in the first receptacle on the opposite side of the connector. A cleaning rod is inserted in the hole, so that an end surface of the rod may contact the end surface of the fiber optic cable and corresponding optical fiber strand to clean the end surface of the fiber strand. The cleaning end surface of the rod in contact with the end surface of the fiber cable may be saturated with a cleaning solution. The rod is rotated within the eccentric hole in the insert in order to clean the end surface of the optical fiber strand.

Because the hole in the insert is eccentric, the cleaning rod is allowed to pass through the center of the fiber optic cable, at which location is normally disposed the optical fiber strand having light energy transmitted therethrough. If the hole in the insert were instead concentric, the cleaning rod would merely rotate about the same center as the fiber optic cable, with the result that no cleaning action would result on the optical fiber strand. The hole formed in the insert extends down to the end surface of the fiber optic cable so that the cleaning rod is fully supported by the insert and must rotate eccentric to the transmission axis of the optical fiber strand.

In place of the cleaning rod, a rod that may be used for both polishing and cleaning may instead be inserted in the hole in the insert so that an end surface of the polishing rod comes in contact with the end surface of the optical fiber strand and the surrounding outer cable. The end surface of the outer cable and fiber strand may normally be formed with a convex surface having a relatively large radius. In order to effectuate proper polishing of the exposed end of the optical fiber strand and outer cable, the end of the polishing rod has a concave surface with a radius slightly larger than that of the cable. This is so the end of the polishing rod will not cut grooves into the end surface of the fiber optic cable and fiber strand. Both the insert and/or the polishing rod may be rotated in order to effectuate polishing of the end surface of the fiber optic cable and optical fiber strand.

BRIEF DESCRIPTION OF THE DRAWINGS

FIG. 1 is a cross-sectional illustration of a mechanical connector having a fiber optic cable inserted in a receptacle on one side of the connector, and having the device of the present invention inserted into a second receptacle in the connector on the side opposite the fiber optic cable;

FIG 2 is a perspective view of an insert which forms a portion of the device of the present invention;

FIG. 3 is an end view of the connector of FIG. 1 having the insert of FIG. 2 inserted into a receptacle in the connector;

FIG. 4 is an enlarged sectional view of the connector of FIG. 1 at the interface point between the end of the fiber optic cable and the device of the present invention;

FIG. 5 is a cross-sectional view of the connector of FIG. 1 having an alternative embodiment of the device of the present invention inserted into a receptacle in the connector;

DETAILED DESCRIPTION OF THE PREFERRED EMBODIMENTS

Figure 6:
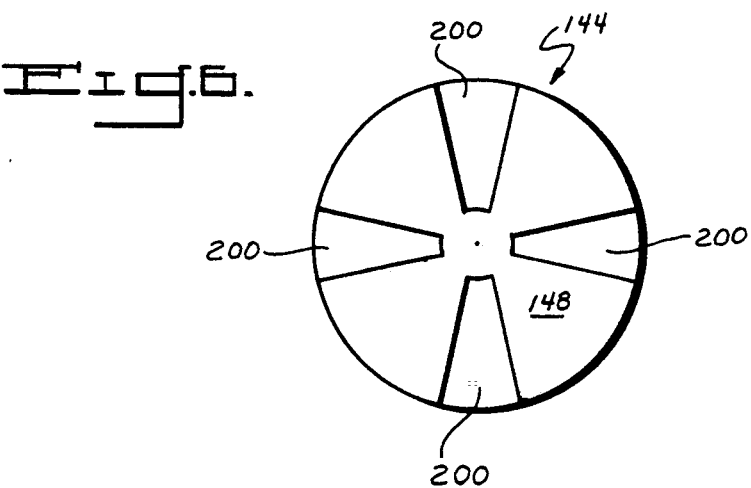
FIG. 6 is an end view of a rod used in the device of FIG. 5.

Referring to the drawings in detail, a device for both cleaning and polishing the end surface of an optical fiber strand, surrounded by an outer cable, and mounted in a receptacle on one side of a connector is illustrated therein and generally designated by the numeral 100. The device includes an insert 104, fabricated from, e.g., nylon, and disposed in a receptacle 108 located on the side of the connector 112 opposite the fiber optic cable 116. A "leg" portion 120 of the insert 104 extends down the receptacle 108 and may be of sufficient length to contact a surface 124 (which may be either flat or formed with a convex radius) of the end of the optical fiber strand 128 and its outer protective cable 116. The leg portion 120 of the insert 104 has a throughbore or hole 132 drilled through the longitudinal axis of the insert 104 such that the hole 132 is eccentric to the transmission axis of the optical fiber strand 128.

To clean the end surface 124 of the optical fiber strand 128, a cleaning rod 136 is inserted in the hole 132 in the insert 104 such that an end surface 140 of the rod 136 is in contact with the end surface 124 of the optical fiber strand 128. The cleaning end of the rod may be saturated or pre-saturated with a cleaning solution. The rod 136 is then rotated within the hole 132 in the insert 104. Because the hole 132 in the insert 104 is eccentric to the transmission axis of the optical fiber strand 128, the cleaning surface 140 of the rod 136 is allowed to pass through the end surface 124 of the optical fiber strand 128. If, instead, the hole 132 in the insert 104 was concentric to the axis of the optical fiber strand 128, the cleaning rod 136 would merely rotate about the same center as the optical fiber strand 128 and result in no cleaning action (i.e., energy across the surface 124) on the end surface 124 of the optical fiber strand 128. Note further that the "leg" portion 120 of the insert 104 does not need to extend down the entire length of the receptacle 108 to contact the surface 124 of the strand 128. It suffices that the leg portion 120 be long enough so as to firmly hold the rod 136 so that the rod rotates eccentric to the optical fiber strand 128.

To polish the end surface 124 (or, in some cases to effect a better cleaning) of the optical fiber strand 128, a polishing rod 144 is inserted in the hole in the insert such that an end surface 148 of the rod 144 is in contact with the end surface 124 of the optical fiber strand 128. The polishing end of the rod 144 may have a concave surface 148 with a radius slightly larger than the radius of the normally convex surface of the optical fiber strand 124 and surrounding cable 116.

FIGS. 1-4 illustrate a first preferred embodiment of a device 100, according to the present invention, for cleaning an end surface 124 of an optical fiber strand 128. FIG. 1 illustrates a cross section of a known mechanical connector 112 for bringing together a pair of fiber optic cables 116. The connector 112 may be one of several different models provided by Gould, Inc., Fiber Optics Division, of Glen Burnie, Md. However, it should be noted that the connector 112 is not limited as such; that is, the connector 112 may comprise any one of a number of commercially-available mechanical connectors for fiber optic cables.

The connector 112 may be fastened to a panel 152 of a piece of equipment 156, such as electronic equipment 156 that amplifies or "boosts" the amplitude of an optical signal propagating in an optical fiber strand 128 within the fiber optic cable 116. Alternatively, the connector may not be associated with any such equipment, but, instead, may be used merely to "splice" two fiber optic cables together. Because of the aforementioned low-loss characteristic of fiber optic cables, such equipment 156 is required approximately every 40 km. or so. The connector 112 is fastened to the equipment 156 by way of, e.g., screws, as better seen in FIG. 3. The connector 112 comprises two body portions 160, 164 which are arranged in a "mirror-image" fashion. The body portions 160, 164 may be fabricated from a metal such as aluminum, or other suitable material. At the end of each body portion 160, 164, and disposed at the farthest distance of that portion from the interface with the equipment 156, may be formed a corresponding threaded portion 168, 172. Within each body portion 160, 164, a cylindrical receptacle 108, 176 is formed from the threaded portion 168, 172 down to the interface of the connector 112 with the equipment panel 152. The receptacle 108, 176 receives a known fiber optic cable 116. As described hereinbefore, the cable 116 typically comprises an inner strand 128 of optical fiber, surrounded by an outer portion 180 that provides various functions, such as protection for the inner strand. The optical fiber strand 128 is typically much smaller in diameter than that of the surrounding cable 180. The strand 128 comprises a core portion, having a typical diameter of eight microns (for a single mode fiber), through which light travels, surrounded by an outer cladding portion, having a diameter of 125 microns. Further, the surface 124 of the strand 128 and corresponding cable 116 may be flat or convex, or its inner strand itself may protrude beyond the surface of the outer cable by (e.g., 1-3 microns).

Attached to the outer surface of the fiber optic cable 116 is an interconnect 184 that is designed to interface with the mechanical connector 112. The interconnect 184 may comprise the series 508 or 908 connector available from Methode Electronics, Inc., Chicago, Ill., or may be one of several types available from Gould, Inc., Fiber Optics Division, Glen Burnie, Md. The interconnect 184 positions the cable 116 within the receptacle 108 of the connector 112 such that the end surface 124 of the fiber optic cable 116 and corresponding optical fiber strand 128 is inserted down to the interface of the connector 112 with the equipment panel. The interconnect 184 may comprise an associated ferrule (not shown) and a "keyed" portion (not shown) for properly positioning the cable 116 within the receptacle 108. A cap 188 may be used to firmly hold the cable 116 within the receptacle 108 of the connector 112. If the connector 112 has the aforementioned threaded portions 168, 172, the cap 188 has corresponding threads which mate with those of the connector 112. Alternatively, the cap 188 may be either a press-on type or slotted type or any other type known and commercially available.

In normal equipment operation, a fiber optic cable 116 is inserted into the corresponding receptacle 108, 176 on each side of the mechanical connector 112. The cables 116 are held in place by the connector caps 188 and associated interconnects 184 such that the transmission axis (i.e., the "core") of each optical fiber strand 128 is in precise alignment with one another. This allows for maximum transfer of light energy between the fiber strands 128. However, as hereinbefore described, the interface between the end surface 124 of the two optical fiber strands 128 may be subject to contamination from fine dust or dirt particles, or grease. Such contamination may seriously degrade the transfer of light energy between the optical fiber strands 128. In accordance with the present invention, a device 100 is provided for cleaning the end surface 124 of the optical fiber strand 128 without the necessity of removing both fiber optic cables 116 from the mechanical connector 112.

FIG. 1 illustrates the device 100 of the present invention, for cleaning the end surface 124 of the optical fiber strand 128. The device 100 is inserted into the receptacle 108 of the mechanical connector 112 on that side of the connector which is located outside of the "booster" equipment 156. Instead of normally inserting the fiber optic cable 116 into the receptacle 108, an insert 104 is disposed therein. The insert 104 is illustrated in perspective in FIG. 2. In the preferred embodiment of the present invention, the insert 104 comprises a cylindrical leg portion 120 of a first diameter, and a cylindrical top portion 192 of a larger second diameter. The insert 104 may be formed in numerous ways and shapes (depending on the specific connector 112 utilized) and may comprise various materials. For example, the insert may be molded, cast or machined to the desirable size. The insert may be made of plastic, molded nylon, polymeric material, metal, or any other formable or machinable material.

As illustrated in FIG. 2 in phantom, a hole 132 is drilled or formed through the entire leg and top portions 120, 192 of the insert 104. The hole 132 is of a diameter smaller than that of the leg portion 120 of the insert. The hole may be formed in the insert such that the material of the leg portion 120 of the insert 104 may be entirely removed along a portion of the circumference of the leg portion. In accordance with the present invention, the axis of the hole 132 formed in the insert 104 is eccentric to the axis of the leg and top portions 120, 192 of the insert. This eccentricity of the hole in the insert can also be seen in FIGS. 1, 3 and 4.

Referring to FIG. 1, the length of the leg portion 120 of the insert 104 is fabricated such that a surface 196 at the end of the leg portion is located at the interface of the body portion 160 of the mechanical connector 112 with the panel 152 of the booster equipment 156. That is, the end surface 196 of the leg portion 120 of the insert 104 is disposed adjacent to and in abutting relation to the end surface 124 of the fiber optic cable 116 and corresponding optical fiber strand 128. However, as mentioned hereinbefore, the leg portion does not have to be long enough such that the end surface 196 contacts the surface 124 of the strand 128. It suffices that the leg portion 120 be long enough to firmly hold the rod 136 in an eccentric relation to the strand 128.

A cap 188 is disposed (e.g., screwed or press fit) onto the corresponding body portion 164 of the connector so as to hold the insert 104 in place within the receptacle 108. However, it is to be understood that a cap is not necessary for the broadest scope of the invention. The diameter of the leg portion 120 may be of such tolerance so that the insert is firmly held in place in the receptacle 108 without need for a cap 188. Further, the top portion 192 of the insert may be eliminated, or may be formed differently from that shown in FIG. 2, so as to provide a method of holding the insert firmly in place in the receptacle 108.

In FIG. 1, a cleaning rod 136 is inserted into the eccentric hole 132 in the insert 104 such that an end surface 140 of the cleaning rod 136 is in contact with the end surface 124 of the optical fiber strand 128 and corresponding fiber optic cable 116 disposed in the receptacle 176 on the other side of the connector 112. The cleaning rod 136 may comprise an absorbent material, such as porous plastic. In an exemplary embodiment, the rod 136 comprises Model No. X4245, commercially available from Interflo, a division of Chromex Corp., Brooklyn, N.Y. In this case, the rod 136 is of one-sixteenth-inch diameter and is two inches in length, and comprises polyvinyledene fluoride. It is to be understood, however, that the rod 136 may comprise any type material which is either molded, extruded, compressed, sintered, or made of composite material or be an assembly of materials resulting the shape of a rod which can be inserted in the eccentric hole 132 of the insert 104.

The end surface 140 of the cleaning rod 136 may be either flat or rounded (i.e., provided with a concave surface of a predetermined radius). In order to clean the end surface 124 of the fiber optic cable 116 and corresponding optical fiber strand 128, the cleaning rod 136 is rotated within the eccentric hole 132 of the insert 104. Because the hole 132 in the insert 104 is eccentric, the end surface 140 of the cleaning rod 136 is allowed to pass through the center of the fiber optic cable 116 where the optical fiber strand 128 is located.

If, instead, the hole 132 in the insert 104 had its axis concentric to the transmission axis of the optical fiber strand 128, the end surface 140 of the cleaning rod 136 would merely rotate about the same axis as the strand 128 and result in no cleaning action on the end surface 124 of the strand 128. Thus, the eccentric hole 132 facilitates the absorption and removal of foreign objects on the surface 124 of the optical fiber strand 128 and fiber optic cable 116 such as grease, dirt and particulate matter, however small.

Further, the end surface 140 of the cleaning rod 136 may be soaked in a solution of, e.g., acetone, isopropyl alcohol or any other cleaning solution suitable for cleaning the end surface 124 of an optical fiber strand 128. It has been found that the isopropyl alcohol ("IPA") removes certain materials soluble in IPA, but may not remove certain greases disposed on the end surface 124 of the optical fiber strand 128. Also, the end surface 140 of the cleaning rod 136 may be coated or wrapped with other cleaning materials suitable for cleaning the optical fiber strand.

FIG. 4 illustrates in greater detail the interface of the end surface 124 of the fiber optic cable 116 and associated optical fiber strand 128 with the end surface 140 of the cleaning rod 136. There, the resulting eccentric placement of the cleaning rod 136 with respect to the optical fiber strand can better be seen. The cleaning rod is rotated either manually or by mechanical means in either a clockwise or counterclockwise direction to clean the end surface 124 of the optical fiber strand 128. FIG. 3 illustrates an end view of the mechanical connector 112 in which the eccentric placement of the rod 136 with respect to the optical fiber strand 128 can be seen in greater detail.

FIG. 5 illustrates an alternative embodiment of the device 100 of the present invention where the rod 144 inserted in the eccentric hole 132 of the insert 104 is used to also polish the end surface 124 of the fiber optic cable 116 and associated optical fiber strand 128. Normally, the end surface 124 of the fiber optic cable 116 and optical fiber strand 128 has a convex shape of a relatively large radius. Such radius is shown in exaggerated form in FIG. 5. The end surface 148 of the polishing rod 144 has a corresponding concave shape with a radius slightly larger than that of the end surface 124 of the fiber optic cable 116. The difference in radii is so that the outer edge of the polishing rod 144 does not cut "grooves" into the end surface 124 of the fiber optic cable 116 and optical fiber strand 128. However, if the end surface 124 of the fiber optic cable 116 and optical fiber strand 128 is flat, then the end surface 148 of the rod 144 may also be flat, or may be concave so as to transform the flat surface 124 into a convex surface.

The polishing rod 144 may comprise either a homogeneous, composite or laminated material capable of polishing the end surface 124 of the fiber optic cable 116 and fiber strand 128. For example, the rod 144 may comprise a plastic, ceramic or resin material having ground diamond dust formed in the material. The diamond dust may be disposed within the rod material either merely at the polishing end of the rod or throughout a larger length of the rod. Polishing of the end surface 124 of the fiber optic cable 116 and associated optical fiber strand 128 may be carried out by rotating just the polishing rod 144 within the insert 104, or by rotating both the rod 144 and the insert 104 in either a clockwise or counterclockwise direction. In a similar manner to the cleaning rod 136 described hereinbefore, the polishing rod 144 carries out an effective polishing of the end surface 124 of the optical fiber strand 128 due to the eccentric nature of the hole 132 formed in the insert 104.

In FIG. 6 is illustrated the end surface 148 of the polishing rod 144 having one or more slots or grooves 200 formed therein. The grooves 200 are operable to "catch" and hold particles of material cleaned and polished from the surface 124 of the strand 128. The grooves also provide relief from thermal build up during the cleaning and polishing operations. The grooves may be of any suitable shape or form.

The device 100 of the present invention may have other uses than those described herein. For example, the insert 104 may be used to facilitate the application of a material, such as an optical epoxy, to the end surface 124 of the optical fiber strand 128. In this example, a suitable applicator having the desired material to be applied on an end of the applicator may be inserted in the hole 132 of the insert 104. The material may be any material that would improve the transmission of light energy.

Also, the insert 104 may be used to facilitate the location of the optical fiber strand 128 within the fiber optic cable 116. Due to manufacturing tolerances, the strand 128 may not always be positioned precisely in the center of the fiber optic cable 116.

Figure 7:
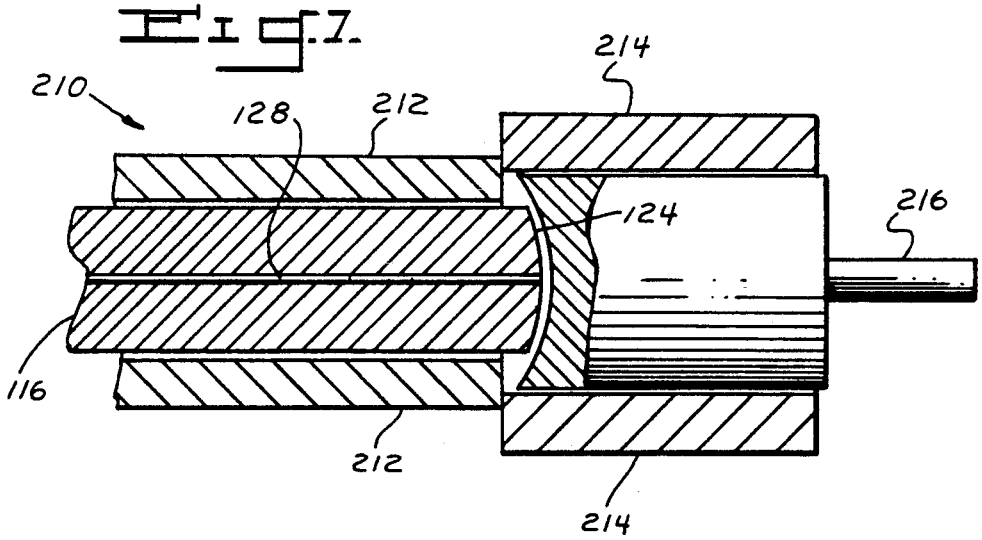
FIG. 7 is a cross-sectional view of a device for polishing a fiber optic cable in accordance with an alternative aspect of the present invention.

Referring to FIG. 7, along with FIGS. 1–6, there illustrated in cross-section is a device 210 used to polish the end surface 124 of an optical fiber strand 128 and associated fiber optic cable 116, before the cable is inserted into an interconnect 184. The device 210 may be used either in the "factory" or in the "field" by personnel. The device 210 makes use of the concept of eccentricity to polish an optical fiber strand.

The device 210 consists of a known holding element 212 for holding the fiber optic cable and for exposing the end surface 124 of the strand 128 and cable 116 to be polished. A tool guide 214 holds a known polishing tool or device 216 (such as the polishing rod 144) that polishes the surface 124. The tool guide 214 is adjustable in a transverse direction to the strand 128. The tool guide 214 may either be a part of the holding element 212 or separable therefrom.

Initially, the tool guide 214 may be positioned such that the center axis of the polishing tool 216 is concentric to the axis of the strand 128. The polishing tool 216 may be either hand or power driven. Final polishing of the end surface 124 of the strand 128 is accomplished with the tool guide 214 adjusted so that the center axis of the polishing tool 216 is eccentric to the strand 128. This causes polishing action to be effective through the center of the cable 116 (i.e., through the strand 128). This method of eccentric polishing leaves little or no loose fiber strands protruding from the end surface 124 of the strand 128 and cable 116. As shown, the end surface 124 of the strand 128 and cable 116 is convex. However, the surface 124 may be flat. Conversely, the end surface of the polishing tool 216 may be either concave (as shown in FIG. 7) or flat, if desired. Also, the end surface of the polishing tool may have grooves formed therein in a similar manner to FIG. 6 for trapping debris resulting from the polishing process.

The device 100 of the present invention has been described as using separate rods 136, 144 for cleaning and polishing; however, a single rod 144 may be used to both clean and polish the end surface 124 of the fiber optic cable 116 and corresponding optical fiber strand 128. In such situation, the end surface 148 of the rod 144 has a concave shape with an appropriate radius, and the rod 144 is made of a suitable material which can absorb and remove particulate matter as well as polish the end surface 124 of the optical fiber strand 128. It is contemplated that a plastic material that is porous enough to effectuate cleaning may be used which is also hard enough to properly polish the strand 128.

The present invention has been described for use with a mechanical connector 112 having a cap 188 that is used to hold the insert 104 in place. However, it is to be understood that such cap 188 is not necessary to the broadest scope of the present invention. Instead, the insert 104 may be fabricated with tolerances such that a "snug" fit of the insert 104 results with the receptacle 108 in the connector 112. Further, if a cap 188 is used, the top surface of the top portion 192 of the insert 104 may be attached to the cap 188 either by adhesive or heat-sealing.

The present invention has been described for use with specific examples of mechanical connectors 112 for fiber optic cables 116. It is to be understood, however, that such connectors are purely exemplary. It is recognized and appreciated that a myriad of different types of mechanical connectors exist that are commercially available. It is contemplated that the present invention may be used on any of these different types of connectors, in light of the teachings herein. That is, it suffices for the present invention that the mechanical connector 112 contain a receptacle 108 into which a fiber optic cable 116 is normally inserted therein. Then, an insert 104 of appropriate size and shape may be inserted into the receptacle 108 in the connector. It suffices that a hole 132 is formed in the insert 104 which is eccentric to the transmission axis of the optical fiber strand 128 that is disposed on the opposite side of the connector 112. The eccentric hole 132 formed in the insert 104 is operable to have a cleaning rod 136 and/or polishing rod 144 inserted therein so as to carry out the desired cleaning and/or polishing operation of the end surface 124 of the fiber optic cable 116 and corresponding optical fiber strand 128.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. In a mechanical connector having a first receptacle for holding a fiber optic cable, the fiber optic cable having an optical fiber strand encased therewithin, the optical fiber strand having an optical axis that is coaxial to a center axis of the fiber optic cable, the connector having a second receptacle with a center axis aligned coaxial with the optical axis of the optical fiber strand, wherein the improvement comprises: an insert, disposed within the second receptacle, having a throughbore formed therein from a first end of the insert down through the insert to a second end of the insert, the throughbore having a center axis that is eccentric to the optical axis of the optical fiber strand; and a rod inserted in the throughbore in the insert, the rod having an end surface disposed adjacent to and in abutting relation to an end surface of the fiber optic cable and corresponding optical fiber strand, the rod is rotated to effectuate cleaning of the end surface of the fiber optic cable and corresponding optical fiber strand.

2. The connector of claim 1, wherein the second end of the insert has a surface that is adjacent to and in abutting relation to the end surface of the fiber optic cable and corresponding optical fiber strand.

3. The connector of claim 1, wherein the end surface of the rod is planar.

4. The connector of claim 1, wherein the end surface of the rod is concave, the rod is rotated to effectuate polishing of the end surface of the fiber optic cable and corresponding optical fiber strand.

5. The connector of claim 4, wherein the concave end surface of the rod has at least one recess formed therein for trapping any debris generated by rotation of the rod to effectuate the polishing of the end surface of the fiber optic cable and corresponding optical fiber strand.

6. The connector of claim 1, wherein the end surface of the rod is concave.

7. A device for insertion into a first receptacle of a mechanical connector, the connector having a second receptacle for holding a fiber optic cable therein, the fiber optic cable having an optical fiber strand encased therewithin, the optical fiber strand having an optical axis that is coaxial to a center axis of the fiber optical cable, a center axis of the first receptacle being disposed in a coaxial relation with the optical axis of the optical fiber strand, wherein the device comprises: an insert, disposed within the first receptacle, having a throughbore formed therein from a first end of the insert down through the insert to a second end of the insert, the throughbore having a center axis that is eccentric to the optical axis of the optical fiber strand, wherein the area of the throughbore at the second end of the insert overlaps the entire area of the optical fiber strand at an end surface of the optical fiber strand; and a rod inserted in the throughbore in the insert, the rod having an end surface disposed adjacent to and in abutting relation to an end surface of the fiber optic cable and corresponding optical fiber strand, the rod is rotated to effectuate cleaning of the end surface of the fiber optic cable and corresponding optical fiber strand.

8. The device of claim 7, wherein the throughbore formed within the insert is cylindrical.

9. The device of claim 7, wherein the second end of the insert has a surface that is adjacent to and in abutting relation to the end surface of the fiber optic cable and corresponding optical fiber strand.

10. The device of claim 7, wherein the end surface of the rod is planar.

11. The device of claim 7, wherein the end surface of the rod is concave, the rod is rotated to effectuate polishing of the end surface of the fiber optic cable and corresponding optical fiber strand.

12. The device of claim 11, wherein the concave end surface of the rod has at least one recess formed therein for trapping any debris generated by rotation of the rod to effectuate the polishing of the end surface of the fiber optic cable and corresponding optical fiber strand.

13. The device of claim 7, wherein the end surface of the rod is concave.

14. In a mechanical connector having a first receptacle for holding a fiber optic cable therein, the fiber optic cable having an optical fiber strand located therewithin in a coaxial relation to a center axis of the fiber optic cable, the connector having a second receptacle with a center axis aligned coaxial with an optical axis of the optical fiber strand, wherein the improvement comprises:
   a. an insert, disposed within the second receptacle, having a cylindrical throughbore formed therein from the first end of the insert down through the insert to a second end of the insert, the cylindrical throughbore having a center axis that is eccentric to the optical axis of the optical fiber strand, wherein the area of the cylindrical throughbore at the second end of the insert overlaps the entire area of the optical fiber strand at an end surface of the strand; and
   b. a rod inserted in the cylindrical throughbore in the insert, the rod having an end surface disposed adjacent to the end surface of the fiber optical cable and corresponding optical fiber strand, the rod adaptable to be rotatable within the cylindrical throughbore.

15. The connector of claim 14, wherein the end surface of the rod contacts the end surface of the fiber optic cable and corresponding optical fiber strand, the rod is rotated to effectuate cleaning of the end surface of the fiber optic cable and corresponding optical fiber strand.

16. The connector of claim 14, wherein the end surface of the rod is planar.

17. The connector of claim 14, wherein the end surface of the rod is concave, the rod and insert are rotated to effectuate polishing and cleaning of the end surface of the fiber optic cable and corresponding optical fiber strand.

18. The connector of claim 17, wherein the concave end surface of the rod has at least one recess therein for trapping any debris generated by rotation of the rod to effectuate polishing of the end surface of the fiber optic cable and corresponding optical fiber strand.

19. The connector of claim 14, wherein the end surface of the rod is concave, the rod is rotated to effectuate cleaning of the end surface of the fiber optic cable and corresponding optical fiber strand.

20. A device for cleaning and polishing an end surface of an optical fiber strand encased in and surrounded by a fiber optic cable, comprising:
   a. holding means for holding the cable in a predetermined position;
   b. means, having an end surface adjacent to an in abutting relation to the end surface of the optical fiber strand, for cleaning and polishing the end surface of the optical fiber strand when the means for cleaning and polishing is rotated; and
   c. guide means for adjustably positioning a center axis of the means for cleaning and polishing to a first position that is eccentric to a center axis of the optical fiber strand.

21. The device of claim 20, wherein the guide means comprises means for adjustably positioning the center axis of the means for cleaning and polishing to a second position that is concentric to the center axis of the optical fiber strand.

22. The device of claim 20, wherein the means for cleaning and polishing comprises a cylindrical rod.

23. The device of claim 20, wherein the end surface of the means for cleaning and polishing is concave.

24. The device of claim 20, wherein the end surface of the means for cleaning and polishing is flat.

25. The device of claim 20, wherein the end surface of the means for cleaning and polishing has at least one recess formed therein for trapping any debris generated during the polishing of the end surface of the optical fiber strand.

* * * * *